US008732771B2

(12) United States Patent
Ansari et al.

(10) Patent No.: US 8,732,771 B2
(45) Date of Patent: *May 20, 2014

(54) SYSTEM FOR PROVIDING DBS DSL VIDEO SERVICES TO MULTIPLE DISPLAY DEVICES

(75) Inventors: Ahmad Ansari, Austin, TX (US); Brad Allen Medford, Austin, TX (US); Russell William White, Austin, TX (US); David Bruce Hartman, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 777 days.

This patent is subject to a terminal disclaimer.

(21) Appl. No.: 11/825,695

(22) Filed: Jul. 9, 2007

(65) Prior Publication Data
US 2007/0261083 A1 Nov. 8, 2007

Related U.S. Application Data

(63) Continuation of application No. 10/191,743, filed on Jul. 8, 2002, now Pat. No. 7,260,825.

(51) Int. Cl.
*H04N 7/18* (2006.01)

(52) U.S. Cl.
USPC ............ 725/82; 725/74; 725/78; 725/80; 348/552

(58) Field of Classification Search
USPC ........ 725/63, 74, 78, 80, 82, 70, 71, 131, 151
See application file for complete search history.

(56) References Cited

U.S. PATENT DOCUMENTS 5,574,964 A 11/1996 Hamlin
5,677,905 A 10/1997 Bigham et al.
(Continued)

FOREIGN PATENT DOCUMENTS

JP 10-164116 6/1998
KR 2000-53787 A 9/2000
(Continued)

OTHER PUBLICATIONS

Dieuleveult F. De: "Transmission Video Sur Paire Torsadee", Electronique Radio Plans, Spe, Paris, Fr., No. 545, Apr. 1, 1993, pp. 25-32, SP00036—including English translation.
(Continued)

*Primary Examiner* — Ngoc Vu
(74) *Attorney, Agent, or Firm* — Jackson Walker L.L.P.

(57) ABSTRACT

Systems and methods for providing direct broadcast satellite (DBS) and digital subscriber line (DSL) video services to multiple display devices are disclosed. Generally the disclosed system receives a plurality of DBS channels and DSL content. The system receives a first user-initiated video selection and generates a first television signal based on the first user-initiated video selection. The first television signal combines video from at least one DBS channel and video from DSL content for simultaneously displaying at least a portion of the video from at least one DBS channel and at least a portion of the video from the DSL content on a display device. The first television signal is then transmitted to a first display device. Additionally, the system receives a second user-initiated video selection, generates a second television signal based on the second user-initiated video selection, and transmits the second television signal to a second display device.

17 Claims, 3 Drawing Sheets

(56) References Cited

U.S. PATENT DOCUMENTS

| | | | |
|---|---|---|---|
| 5,734,589 A | 3/1998 | Kostreski et al. | |
| 5,828,403 A | 10/1998 | DeRodeff et al. | |
| 5,923,361 A | 7/1999 | Sutton, Jr. | |
| 5,936,660 A | 8/1999 | Gurantz | |
| 5,968,118 A | 10/1999 | Sutton, Jr. | |
| 6,188,871 B1 | 2/2001 | Kitamura et al. | |
| 6,205,582 B1 | 3/2001 | Hoarty | |
| 6,286,142 B1 | 9/2001 | Ehreth | |
| 6,317,884 B1 | 11/2001 | Eames et al. | |
| 6,598,231 B1 | 7/2003 | Basawapatna et al. | |
| 6,745,392 B1 * | 6/2004 | Basawapatna et al. | 725/120 |
| 6,888,850 B2 * | 5/2005 | Perini et al. | 370/486 |
| 6,940,874 B2 | 9/2005 | Ruszczyk et al. | |
| 7,096,489 B2 | 8/2006 | Kitsukawa et al. | |
| 7,200,855 B2 | 4/2007 | Laksono | |
| 7,260,825 B2 | 8/2007 | Ansari et al. | |
| 2002/0002709 A1 | 1/2002 | An | |
| 2002/0007490 A1 | 1/2002 | Jeffery | |
| 2002/0007494 A1 | 1/2002 | Hodge | |
| 2002/0012353 A1 | 1/2002 | Gerszberg et al. | |
| 2002/0019984 A1 | 2/2002 | Rakib | |
| 2002/0031120 A1 | 3/2002 | Rakib | |
| 2002/0044225 A1 | 4/2002 | Rakib | |
| 2002/0059634 A1 | 5/2002 | Terry | |
| 2002/0059637 A1 | 5/2002 | Rakib | |
| 2002/0078465 A1 | 6/2002 | Stahl et al. | |
| 2002/0129375 A1 | 9/2002 | Kim et al. | |
| 2002/0129383 A1 | 9/2002 | Wasilewski | |
| 2002/0152464 A1 | 10/2002 | Kitsukawa et al. | |
| 2004/0060072 A1 | 3/2004 | Klein | |
| 2004/0172658 A1 * | 9/2004 | Rakib et al. | 725/120 |
| 2005/0246754 A1 | 11/2005 | Desai et al. | |

FOREIGN PATENT DOCUMENTS

| | | | |
|---|---|---|---|
| WO | WO9222983 | * | 12/1992 |
| WO | WO 00/22821 A | | 4/2000 |
| WO | WO 01/05156 A1 | | 1/2001 |
| WO | WO 01/99423 A1 | | 12/2001 |

OTHER PUBLICATIONS

Office Action, KR Patent Application No. 2004-7021629, Mar. 29, 2010, 4 pages; English translation, 3 pages.

* cited by examiner

SYSTEM FOR PROVIDING DBS DSL VIDEO SERVICES TO MULTIPLE DISPLAY DEVICES

RELATED APPLICATIONS

The present patent document is a continuation of U.S. patent application Ser. No. 10/191,743, filed Jul. 8, 2002, now U.S. Pat. No. 7,260,825 the entirety of each of which is hereby incorporated by reference.

BACKGROUND

1. Field of the Invention

The present invention relates to direct broadcast satellite (DBS) and digital subscriber line (DSL) video services.

2. Description of the Related Art

Many homes have more than one distribution network to delivery telephony and video services to its various rooms. A telephone distribution network within a home typically comprises twisted-pair copper lines which are connected to a telephony company network. A video distribution network within a home typically comprises coaxial cables which are connected to a cable television provider's network or a DBS dish.

A shortcoming of both DBS services and digital cable video services is that consumers are required to have a digital set-top box per television set. A shortcoming of DBS services, unlike cable television services, is a lack of providing real-time interactive services such as video-on-demand services.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Disclosed herein are methods and systems which integrate DBS and DSL networks to deliver interactive entertainment video services in a seamless manner. By combining a broadband data service such as DSL with a DBS service, a complete entertainment package including content such as broadcast video, Pay Per View (PPV), Video-On-Demand (VOD), Near VOD (NVOD), interactive gaming and music can be offered.

A single in-home unit which integrates the DSL network and the DBS network is disclosed herein. The single unit can serve multiple television sets from a single location inside the home using an in-home coaxial distribution network. The single unit beneficially eliminates a need for multiple set-top boxes inside a home to provide multi-channel interactive digital video services to multiple television sets.

Figure 1:
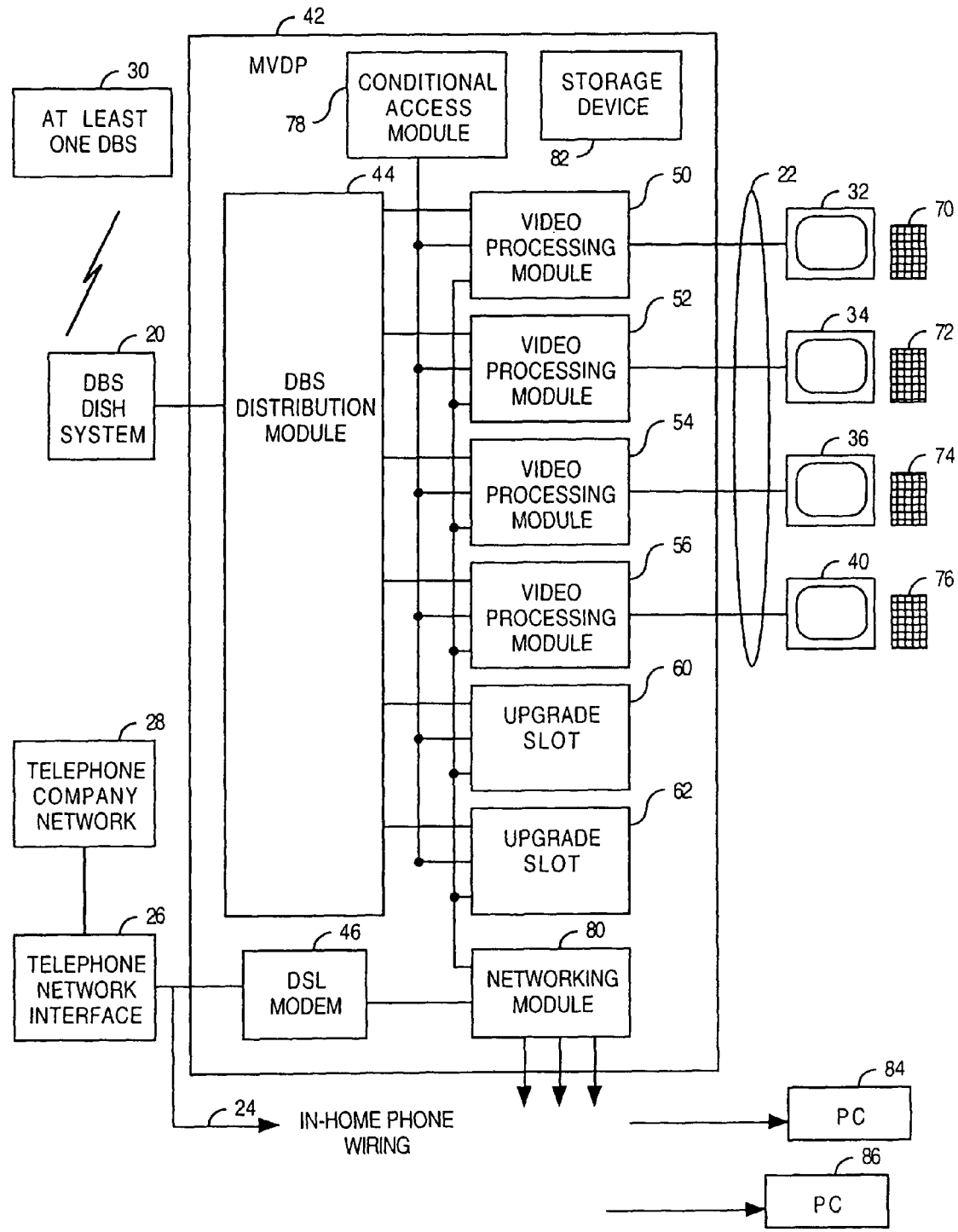
FIG. 1 is a block diagram of an embodiment of a system to integrate DBS and DSL inside a home.

FIG. 1 is a block diagram of an embodiment of a system to integrate DBS and DSL inside a home. The home has a DBS dish system 20, a coaxial distribution network 22, an in-home telephone distribution network 24, and a telephone network interface 26 coupled to a telephone company network 28. The DBS dish system 20 receives direct broadcast satellite programming signals from at least one direct broadcast satellite 30. The coaxial distribution network 22 delivers received video/audio programming to multiple television sets 32, 34, 36 and 40 in the home. The in-home telephone distribution network 24 is coupled to the telephone network interface 26 to provide telephone and DSL services within the home.

The system comprises a multi-channel video/data processor (MVDP) 42. The MVDP 42 serves to provide multichannel digital video services by generating television signals which integrate audio/video streams from both the DSB and the DSL services. The MVDP 42 also serves to eliminate the need for multiple set-top boxes within the home.

For the purpose of this patent application, the term "video" should be construed as being inclusive of both video with accompanying audio and video without accompanying audio. Further, the term "content" should be construed as being inclusive of audio without accompanying video, video without accompanying audio, and video with accompanying audio.

The MVDP 42 comprises a DBS distribution module 44. The DBS distribution module 44 is coupled to the DBS dish system 20 by a coaxial cable or another transmission medium. The DBS distribution module 44 allows for simultaneous reception of multiple channels provided by the DBS service. The multiple channels may include any combination of broadcast video, PPV, NVOD and non-real-time VOD video received by the DSB dish system 20.

The MVDP 42 further comprises a DSL modem 46 to transmit and receive signals via a DSL network. The DSL network is used to handle real-time interactive services and real-time VOD services. Typically, the DSL network is accessible by the home via the telephone company network 28.

The MVDP 42 further comprises a plurality of video processing modules. For purposes of illustration and example, four video processing modules 50, 52, 54 and 56 are depicted, although any plurality of video processing modules may be employed. The number of video processing modules is based on the number of different television sets that are allowed to receive the video service.

Preferably, each video processing module is embodied by a removable card that facilitates installation in and removal from the MVDP 42. In this case, the MVDP 42 has a plurality of card-receiving slots to receive a plurality of video processing modules. For purposes of illustration and example, the MVDP 42 may have six card-receiving slots to receive at most six video processing modules. Thus, with four video processing modules in the MVDP 42, two card-receiving slots 60 and 62 are unoccupied. The MVDP 42 may be upgraded to accommodate more than four television sets by installing one or two video processing modules in the two card-receiving slots 60 and 62. Alternatively, some of the video processing modules 50, 52, 54 and 56 may be permanently integrated with the MVDP 42, in other words, may be non-removable from the MVDP 42.

The system comprises a plurality of remote control devices 70, 72, 74 and 76 to facilitate independent user control of programming to the television sets 32, 34, 36 and 40, respectively. Each of the remote control devices 70, 72, 74 and 76 receives user-initiated content selections from any of multiple DBS channels, multiple DSL content, and multiple combinations of DBS channels and DSL content. The multiple DBS channels may include multiple broadcast video channels, multiple PPV broadcast channels, multiple NVOD broadcast channels, and multiple non-real-time VOD channels. The multiple DSL content may include multiple VOD video programs, multiple interactive games, and interactive music such as music-on-demand. The multiple DBS-DSL combinations may include multiple interactive programs.

Each of the video processing modules 50, 52, 54 and 56 is responsive to a corresponding one of the remote control devices 70, 72, 74 and 76, respectively. Each remote control device may communicate with its associated video processing module either wirelessly or via a wireline.

Each video processing module requests any of a DBS channel, DSL content, or a combination of a DBS channel and DSL content based on the user-initiated video selection made using the corresponding remote control device.

The DBS distribution module 44 is responsive to the DBS requests from the video processing modules 50, 52, 54 and 56. The DBS requests include those for DBS channels and the DBS portions of DBS-DSL combinations. The DBS distribution module 44 simultaneously receives all DBS channels requested by the video processing modules 50, 52, 54 and 56. A conditional access module 78 enables premium DBS channels to be received and descrambled, if necessary. The DBS distribution module 44 distributes the received DBS channels to those of the video processing modules requesting same.

The DSL modem 46 is responsive to the DSL requests from the video processing modules 50, 52, 54 and 56. The DSL requests include those for DSL content and the DSL portions of DBS-DSL combinations. The DSL modem 46 is to receive via the DSL network all DSL content requested by the video processing modules 50, 52, 54 and 56.

A networking module 80 networks the DSL modem 46 with the video processing modules 50, 52, 54 and 56. The networking module 80 communicates the DSL requests made by the video processing modules 50, 52, 54 and 56 to the DSL modem 46. Further, the networking module 80 receives all DSL content from the DSL modem 46, and distributes the DSL content to those of the video processing modules 50, 52, 54 and 56 requesting same.

For each of the video processing modules 50, 52, 54 and 56 whose selected content includes DSL content, a connection is established through the DSL network between the video processing module and a corresponding server (e.g. a video server) that hosts the content. After validating pre-established rules for VOD content delivery, the video stream is sent to the video processing module for processing.

Each video processing module generates a television signal based on either a DBS channel signal provided by the DBS distribution module 44, a DSL content signal provided by the networking module 80, or a combination of a DBS channel signal and a DSL content signal. Each video processing module has a video decoding/decompression engine with associated support electronics to decode compressed video streams from both the DBS and DSL feeds. For example, each video processing module may comprise a Moving Picture Experts Group (MPEG) decoder/decompression engine to generate a video signal based on an MPEG broadcast stream. For a DBS-DSL combination, the video processing module may blend the DBS channel signal with the DSL content signal. This may involve blending a MPEG2 video broadcast stream with an interactive signal from DSL.

To generate the television signal based on decoded, decompressed and/or blended video, each video processing module includes a radio frequency (RF) modulator. The RF modulator generates a standard television signal on a specific frequency. Examples of the standard television signal include, but are not limited to, National Television Systems Committee (NTSC), digital High-Definition Television (HDTV), digital Standard-Definition Television (SDTV), Phase Alternation each Line (PAL) and Sequential Color with Memory (SECAM). Examples of the specific frequency include, but are not limited to, frequencies corresponding to Very High Frequency (VHF) channels 3 or 4.

Optionally, the MVDP 42 comprises a data storage device 82 to store content downloaded via either DBS or DSL. The stored content can be selected using any of the remote control devices 70, 72, 74 and 76 for playback on any of the television sets 32, 34, 36 and 40, respectively.

In particular, each of the video processing modules 50, 52, 54 and 56 is responsive to its corresponding one of the remote control devices 70, 72, 74 and 76 to request that DBS content, DSL content or DBS-DSL content be stored by the data storage device 82. To facilitate user selection of the record function, the remote control devices 70, 72, 74 and 76 may comprise a dedicated record function key, a soft key temporarily dedicated to the record function, and/or a selection key which facilitates an onscreen selection of the record function.

Further, each of the video processing modules 50, 52, 54 and 56 is responsive to its corresponding one of the remote control devices 70, 72, 74 and 76 to request that stored DBS content, DSL content or DBS-DSL content be retrieved from the data storage device 82 for playback on the corresponding one of the television sets 32, 34, 36 and 40. To facilitate user selection of the record function, the remote control devices 70, 72, 74 and 76 may comprise a dedicated playback function key, a soft key temporarily dedicated to the playback function, and/or a selection key which facilitates an on-screen selection of the playback function.

Using the record and playback functions, the data storage device 82 supports downloading of VOD content via either DBS or DSL for non-real-time VOD services of popular movies and content.

Examples of the data storage device 82 include, but are not limited to, a magnetic storage device, an electronic storage device and an optical storage device. Examples of the magnetic storage device include, but are not limited to, a hard disk drive. Examples of the electronic storage device include, but are not limited to, an electronic memory card storage device. Examples of the optical storage device include, but are not limited to, an optical disk storage device such as a DVD-R or a DVD-RW device.

The networking module 80 also supports broadband data services to personal computers in the home. For purposes of illustration and example, two personal computers 84 and 86 are depicted, although those having ordinary skill will recognize that other numbers of personal computers may be supported by the networking module 80. The networking module 80 may communicate with the personal computers 84 and 86 via either a wireless interface such as 802.11b or a wireline interface. A wireline interface such as HomePNA uses existing telephone wiring within the home for data networking. If the home has Category 5 wiring, the wireline interface may comprise an Ethernet switch module at the MVDP 42 to enable data networking via the Category 5 wiring.

The above-described MVDP 42 enables use of DSL as a two-way communication system which supplements DSL broadcasts, and blending of broadcast DBS video with interactive broadband DSL video content. The MVDP 42 also enables each television set to be equipped with a wireless remote control that is programmed to operate with its corresponding video processing module.

Figure 2:
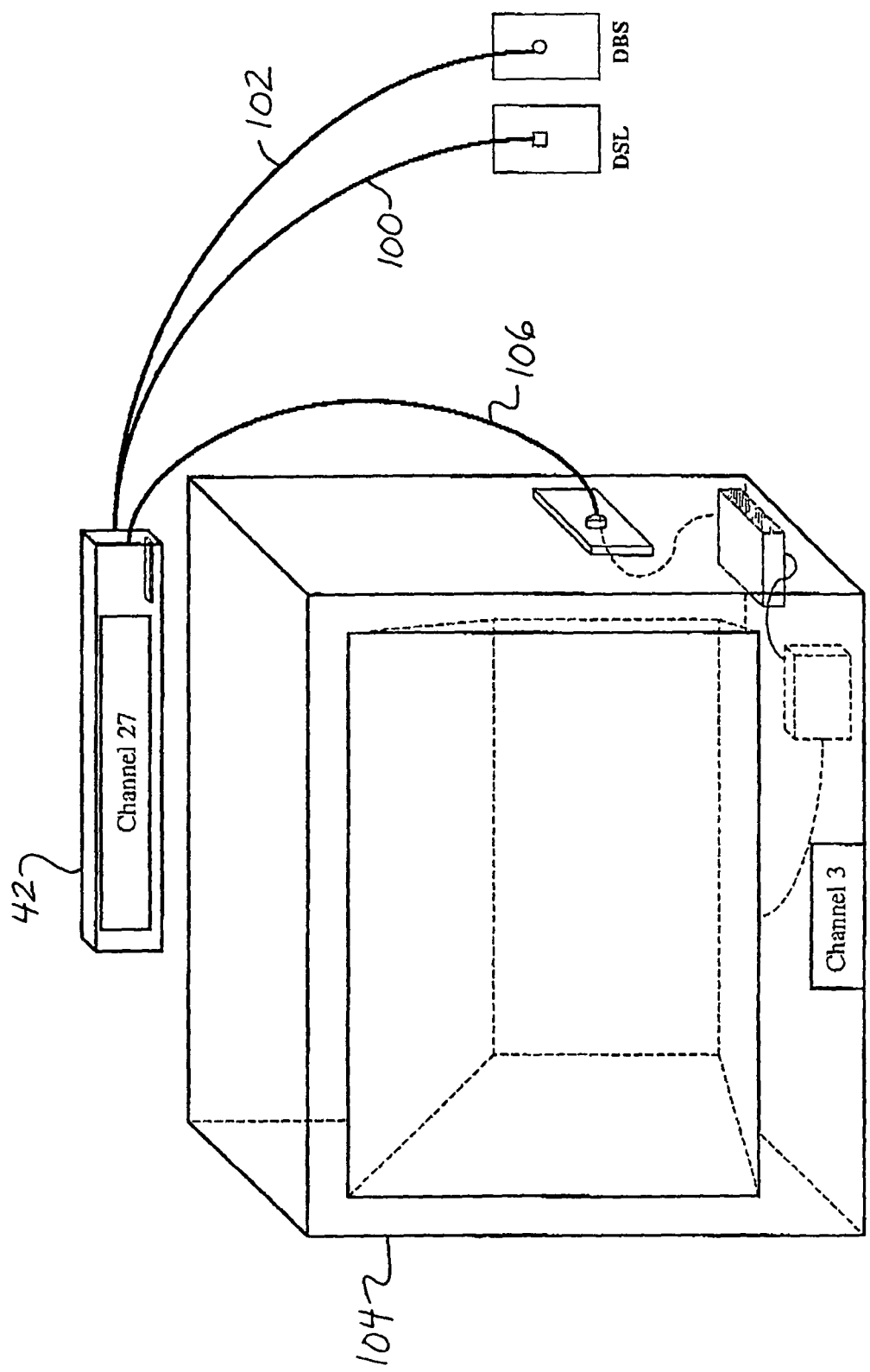
FIG. 2 is an environmental view of an embodiment of a multi-channel video/data processing unit.

FIG. 2 is an environmental view of an embodiment of the MVDP 42. The MVDP 42 has a DSL interface to enable a connection to the DSL network via premise twisted pair wiring 100. The MVDP 42 has a DBS interface to enable a connection to the DBS dish system via coaxial cabling 102. The MVDP 42 has an output interface to enable a connection to a television set 104 via coaxial cabling 106. The television set 104 is tuned to a fixed frequency, such as the frequency corresponding to VHF channel 3, based on the frequency of the RF modulator in the MVDP 42. The MVDP 42 provides the user-selected content to the television set 104. For example, the user-selected content may comprise an interactive television show on DBS Channel 27.

In an alternative embodiment, the MVDP 42 may be modified to support only one video processing module. In this case, the modified unit may be a set-top box dedicated to a single television set. As another alternative, the modified unit may be integrated with the single television set.

Figure 3:
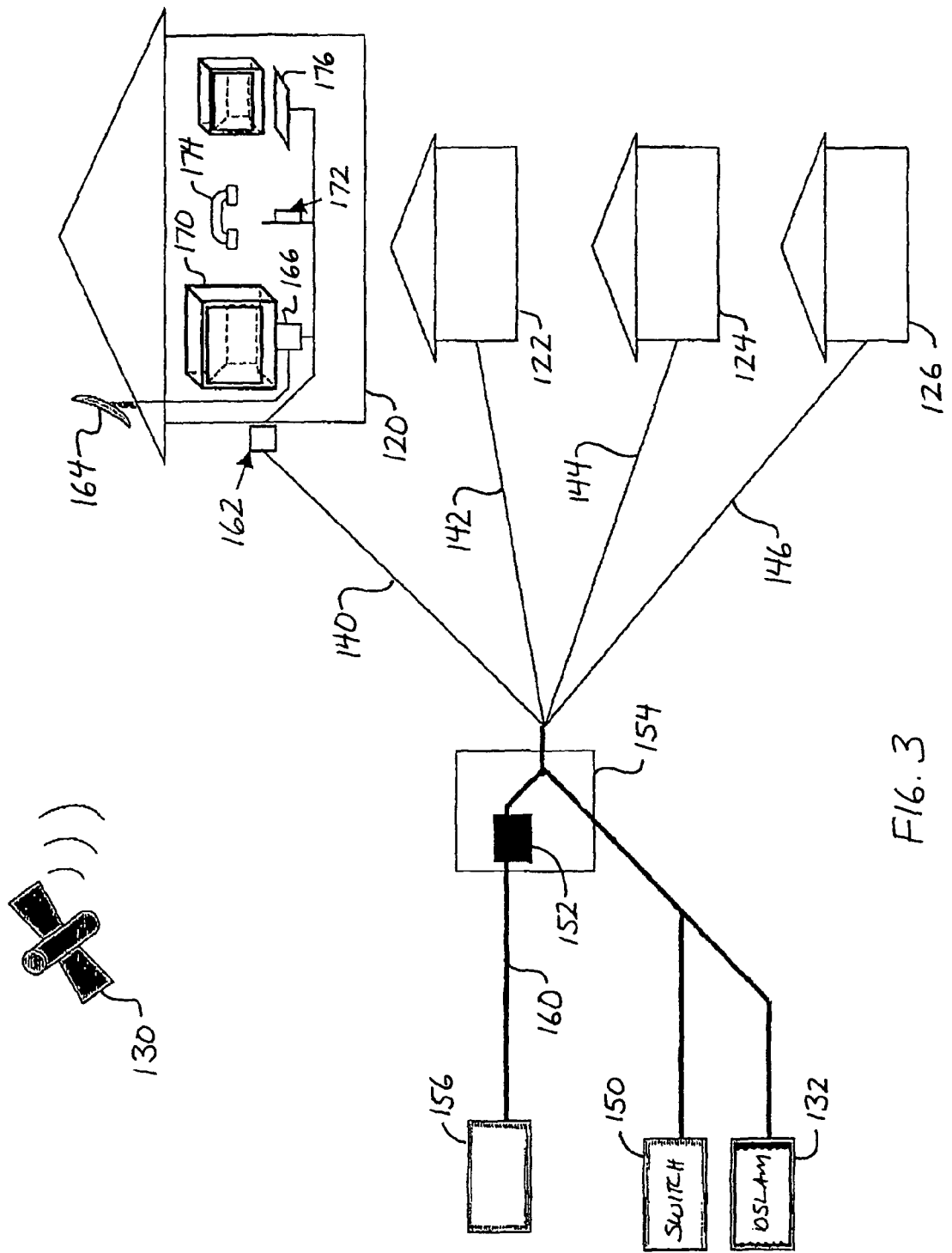
FIG. 3 is a schematic block diagram of an infrastructure to provide an integrated DBS/DSL service to a plurality of homes.

FIG. 3 is a schematic block diagram of an infrastructure to provide an integrated DBS/DSL service to a plurality of homes. For purposes of illustration and example, four homes 120, 122, 124 and 126 are illustrated, although those having ordinary skill will recognize that other numbers of homes may be served. A direct broadcast satellite 130 provides DBS content to homes in a wide geographical area, including the homes 120, 122, 124 and 126. DSL content is provided to homes in a smaller geographical area by either a conventional DSL network or an Ethernet-based DSL network.

A conventional DSL network comprises a DSL Access Multiplexer (DSLAM) 132 located at a telephone company office such as a central office. The DSLAM 132 is capable of providing DSL services to the homes 120, 122, 124 and 126 via existing telephone lines 140, 142, 144 and 146, respectively. The DSLAM 132 may serve hundreds of DSL subscribers in a servicing area. The DSLAM 132 aggregates traffic received from various subscribers to send to a network center via a fiber optic link. The network center, in turn, provides access to a network such as an Internet.

It is noted that telephone services are provided to the homes 120, 122, 124 and 126 via the telephone lines 140, 142, 144 and 146. A telephone switch 150 such as a Class 5 switch provides the telephone services.

Embodiments of Ethernet-based DSL networks are described in detail in a co-pending U.S. Patent Application entitled "ETHERNET-BASED DIGITAL SUBSCRIBER LINE METHODS AND SYSTEMS", Ser. No. 10/191,981, filed on Jul. 8, 2002, which is hereby incorporated by reference in its entirety in the present disclosure. A brief description of an Ethernet-based DSL network is as follows.

A remote Ethernet device 152 is disposed in a serving area interface 154. The remote Ethernet device 152 serves as an Ethernet bridge for a neighborhood service area which includes the homes 120, 122, 124 and 126. The remote Ethernet device 152 communicates with modems in the homes using an Internet Protocol over a first Ethernet standard with a DSL physical layer. Preferably, the first Ethernet standard is either a Twisted Ethernet standard suitable for communicating data over a twisted pair transmission line such as standard telephone transmission line, or another wire-based Ethernet standard. The DSL physical layer may be based on at least one of Data Over Cable Service Interface Specifications (DOCSIS), Asymmetric Digital Subscriber Line (ADSL), Very-high-data-rate Digital Subscriber Line (VDSL), Symmetrical Digital Subscriber Line (SDSL), and Multirate DSL (MDSL).

The remote Ethernet device 152 communicates with an Ethernet switch 156 disposed at a central office via a fiber optic medium 160 using an Internet Protocol over a second Ethernet standard. Preferably, the second Ethernet standard comprises a gigabit Ethernet standard or another Ethernet standard suitable for communicating data over fiber optic transmission media. The Ethernet switch 156 provides a packet data core network termination.

Regardless of whether conventional DSL or Ethernet-based DSL is used, the home 120 has access to the DSL and telephone networks at a gateway 162. The home 120 has a DBS dish system 164 to provide access to the DBS network via the direct broadcast satellite 130. A DBS-DSL integrator 166, such as an MVDP, is coupled to the DBS dish system 164 and the gateway 162. The DBS-DSL integrator 166 provides video services to a television set 170. A filter 172 is interposed between a telephone 174 and the gateway 162 to mitigate interference between DSL and voice services. A personal computer 176 can access the DSL network either directly from the gateway 162 or from a networking module of the DBS-DSL integrator 166.

It will be apparent to those skilled in the art that the disclosed inventions may be modified in numerous ways and may assume many embodiments other than the preferred forms specifically set out and described herein. For example, other interactive point-to-point broadband networks may be substituted for DSL, other broadcast video services such as cable television may be substituted for DBS, and other types of input devices may be substituted for the remote controls.

Accordingly, it is intended by the appended claims to cover all modifications which fall within the true spirit and scope of the present invention.

The invention claimed is:

1. An apparatus, comprising:
an in-home data and multi-channel video processor, including:
    a direct broadcast satellite distribution module operative to:
        receive a single direct broadcast satellite input signal including a plurality of direct broadcast satellite content channels; and
        generate a plurality of distribution module output signals, each distribution module output signal conveying a desired direct broadcast satellite content channel;
    a digital subscriber line module operative to receive a digital subscriber line content signal; and
    a plurality of video processing modules, each video processing module associated with a corresponding distribution module output signal and including:
        a digital subscriber line input to receive the digital subscriber line content signal;
        select the desired direct broadcast satellite content channel from any of the plurality of direct broadcast satellite content channels; and
        a satellite content input to receive the desired direct broadcast satellite content channel via the corresponding distribution module output signal.

2. The apparatus of claim 1, wherein each video processing module is operative to:
select the desired direct broadcast satellite content channel based on a user-initiated direct broadcast satellite selection signal indicating one of the plurality of direct broadcast satellite content channels.

3. The apparatus of claim 1, wherein each video processing module is operative to:
generate a video processing module output signal comprising content selected from the digital subscriber line content signal, the corresponding distribution module output signal, and a combination of the digital subscriber line content signal and the corresponding distribution module output signal.

4. The apparatus of claim 1, further comprising:
a personal computer in communication with the digital subscriber line module to receive the digital subscriber line content signal.

5. The apparatus of claim 1, further comprising:
a data storage device in communication with the direct broadcast satellite distribution module and the digital subscriber line module to receive and store the direct broadcast satellite content channels and the digital subscriber line content signal for subsequent playback.

6. The apparatus of claim 1, wherein each of the plurality of video processing modules is configured for communication with a corresponding television set.

7. The apparatus of claim 1, further comprising:
at least two computer-card receiving slots, wherein the direct broadcast satellite distribution module comprises a first computer card operable to be received by a first computer-card receiving slot, and the digital subscriber line module comprises a second computer card operable to be received by a second computer-card receiving slot.

8. The apparatus of claim 1, wherein the digital subscriber content signal comprises video on demand content.

9. The apparatus of claim 1, wherein the digital subscriber line content signal and the direct broadcast satellite input signal are conveyed to the in home data and multi-channel video processor over different physical layers.

10. A non-transitory computer readable medium including processor executable instructions, which, when executed by a processor, cause the processor perform operations comprising:
receiving, by an in-home video and data processor, a direct broadcast satellite input signal including a plurality of direct broadcast satellite content channels;
generating a plurality of distribution module output signals, each distribution module output signal conveying a desired direct broadcast satellite content channel;
receiving, by the in home video and data processor, a digital subscriber line content signal;
providing the digital subscriber line content signal to a first input on each of a plurality of video processing modules;
receiving a plurality of direct broadcast satellite selection signals, each direct broadcast satellite selection signal respectively indicating the desired direct broadcast satellite content channel selected from the plurality of direct broadcast satellite content channels; and
providing each desired direct broadcast satellite content channel to a second input of a corresponding one of the plurality of video processing modules.

11. The non-transitory computer readable medium of claim 10, wherein the operations include:
storing, to a data storage device for subsequent playback, at least one of the plurality of distribution module output signals and the digital subscriber line content signal.

12. The non-transitory computer readable storage medium of claim 10, wherein the operations include:
generating a video processing module output signal for each of the plurality of video processing modules, each video processing module output signal comprising content selected from the group consisting of the digital subscriber line content signal, the distribution module output signal corresponding to the video processing module, and a combination of the digital subscriber line content signal and the distribution module output signal.

13. The non-transitory computer readable medium of claim 10, wherein the digital subscriber line content signal and the direct broadcast satellite input signal are conveyed to the in home data and multi-channel video processor over different physical layers.

14. A method, comprising:
performing, by an in home data and multi-channel video processor, operations including:
receiving a direct broadcast satellite input signal including a plurality of direct broadcast satellite content channels;
generating a plurality of distribution module output signals, each distribution module output signal conveying a desired direct broadcast satellite content channel;
receiving a digital subscriber line content signal;
distributing the digital subscriber line content signal to first input of each of a plurality of video processing modules;
receiving a plurality of direct broadcast satellite selection signals, each direct broadcast satellite selection signal respectively indicating the desired direct broadcast satellite content channel selected from the plurality of direct broadcast satellite content channels, wherein each distribution module output signal corresponds to one of the direct broadcast satellite selection signals; and
providing each desired direct broadcast satellite content channel to a second input of a corresponding one of the plurality of video processing modules.

15. The method of claim 14, further comprising:
storing, to a data storage device for subsequent playback, at least one of the plurality of distribution module output signals and the digital subscriber line content signal.

16. The method of claim 14, further comprising:
generating a video processing module output signal for each of the plurality of video processing modules, each video processing module output signal comprising content selected from the group consisting of the digital subscriber line content signal, the distribution module output signal corresponding to the video processing module, and a combination of the digital subscriber line content signal and the distribution module output signal.

17. The method of claim 14, wherein the digital subscriber line content signal and the direct broadcast satellite input signal are conveyed to the in home data and multi-channel video processor over different physical layers.

* * * * *